United States Patent
Renner

(10) Patent No.: US 10,780,832 B2
(45) Date of Patent: Sep. 22, 2020

(54) SHELVING SYSTEM

(71) Applicant: Daimler AG, Stuttgart (DE)

(72) Inventor: Joachim Renner, Waiblingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/631,213

(22) PCT Filed: Jun. 5, 2018

(86) PCT No.: PCT/EP2018/064673
§ 371 (c)(1),
(2) Date: Jan. 15, 2020

(87) PCT Pub. No.: WO2019/015842
PCT Pub. Date: Jan. 24, 2019

(65) Prior Publication Data
US 2020/0139893 A1    May 7, 2020

(30) Foreign Application Priority Data

Jul. 19, 2017  (DE) .......................... 10 2017 006 829

(51) Int. Cl.
*B60R 5/00* (2006.01)
*A47F 5/00* (2006.01)
(Continued)

(52) U.S. Cl.
CPC .............. *B60R 5/003* (2013.01); *A47B 49/00* (2013.01); *A47F 5/0037* (2013.01); *A47L 19/04* (2013.01); *B60P 3/00* (2013.01)

(58) Field of Classification Search
CPC .... A47F 5/0037; A47F 5/0087; A47B 46/005; A47B 57/04; B60R 5/003
(Continued)

(56) References Cited

U.S. PATENT DOCUMENTS 559,744 A * 5/1896 Price ..................... A47F 5/0037
                                                     211/81
914,606 A * 3/1909 Sabo ........................ A47F 5/13
                                                     211/130.1
(Continued)

FOREIGN PATENT DOCUMENTS

DE        93 00 972 U1    3/1993
DE        201 02 573 U1   4/2001
(Continued)

OTHER PUBLICATIONS

International Search Report (PCT/ISA/210) issued in PCT Application No. PCT /EP2018/064673 dated Jul. 25, 2018 with English translation (four (4) pages).
(Continued)

*Primary Examiner* — Jonathan Liu
*Assistant Examiner* — Devin K Barnett
(74) *Attorney, Agent, or Firm* — Crowell & Moring LLP

(57) ABSTRACT

A shelving system for a motor vehicle has at least one shelf, which includes a base unit with a base element supported in a base position allocated to the base element on a support element and is mounted on a pivoting axis. The base element can be shifted around the axis out of the base position allocated to it into an access position allocated to the base element, in which the base element is raised by the at least one support element. A further base element is supported in a base position allocated to the further base element on the support element and is mounted on a further pivoting axis arranged on the side of the support element opposite the first pivoting axis. The further base element can be shifted into an access position, in which the further base element is raised by the support element.

11 Claims, 5 Drawing Sheets

(51) Int. Cl.
  *B60P 3/00* (2006.01)
  *A47B 49/00* (2006.01)
  *A47L 19/04* (2006.01)

(58) Field of Classification Search
  USPC ........ 211/144, 150, 170, 171, 126.16, 129.1, 211/130.1, 131.1, 41.5, 41.6, 85, 126.6, 211/132.1
  See application file for complete search history.

(56) References Cited

U.S. PATENT DOCUMENTS

| | | | | |
|---|---|---|---|---|
| 1,099,857 A * | 6/1914 | Mills | ................ | A47F 7/163 |
| | | | | 211/45 |
| 1,106,569 A * | 8/1914 | Kessler | ................ | A47B 43/00 |
| | | | | 108/179 |
| 1,283,871 A * | 11/1918 | Nichols | ................ | B65G 57/18 |
| | | | | 414/789.5 |
| 1,345,244 A * | 6/1920 | Riley | ................ | A47F 5/0037 |
| | | | | 211/82 |
| 1,647,723 A * | 11/1927 | Casali | ................ | A47B 43/00 |
| | | | | 108/176 |
| 1,666,074 A * | 4/1928 | Steinhilber | ................ | B65H 45/101 |
| | | | | 211/45 |
| 1,944,649 A * | 1/1934 | Smith, Sr. | ................ | A47F 7/08 |
| | | | | 211/37 |
| 1,955,769 A * | 4/1934 | Reynolds | ................ | G09F 5/02 |
| | | | | 211/130.1 |
| 2,334,825 A * | 11/1943 | Jones | ................ | A47B 87/02 |
| | | | | 211/126.2 |
| 2,445,164 A * | 7/1948 | Worthman | ................ | A47G 25/0664 |
| | | | | 160/127 |
| 2,454,575 A * | 11/1948 | Silene | ................ | G09F 5/02 |
| | | | | 190/17 |
| 2,491,374 A * | 12/1949 | Gold | ................ | B25H 3/023 |
| | | | | 190/17 |
| 2,563,212 A * | 8/1951 | Cole | ................ | B29D 30/0016 |
| | | | | 108/2 |
| 2,584,489 A * | 2/1952 | Morrison | ................ | A47F 5/108 |
| | | | | 211/149 |
| 3,124,254 A * | 3/1964 | Davidson | ................ | B65D 7/26 |
| | | | | 211/132.1 |
| 3,258,128 A * | 6/1966 | McPherson | ................ | B62B 3/006 |
| | | | | 211/133.1 |
| 3,622,012 A * | 11/1971 | Lundgren | ................ | A47F 7/147 |
| | | | | 211/126.13 |
| 3,648,909 A * | 3/1972 | Wisecarver | ................ | B65D 21/0226 |
| | | | | 294/169 |
| 5,938,051 A * | 8/1999 | Scholler | ................ | B65G 1/14 |
| | | | | 211/150 |
| 6,357,605 B1 * | 3/2002 | Martorella | ................ | A47L 19/04 |
| | | | | 211/41.5 |
| 8,087,108 B2 * | 1/2012 | Burns | ................ | A47J 47/20 |
| | | | | 4/657 |
| 8,960,452 B2 * | 2/2015 | Rhodes, II | ................ | A47L 19/04 |
| | | | | 211/41.6 |
| 9,089,965 B1 * | 7/2015 | Cheng | ................ | B65D 43/16 |
| 2001/0040141 A1 * | 11/2001 | Martorella | ................ | A47L 19/04 |
| | | | | 211/41.6 |
| 2006/0255609 A1 * | 11/2006 | Squyres | ................ | B60P 3/04 |
| | | | | 296/24.44 |

FOREIGN PATENT DOCUMENTS

DE 20 2012 011 292 U1 2/2013
DE 10 2014 105 723 A1 10/2015
WO WO 01/40023 A2 6/2001

OTHER PUBLICATIONS

German-language Written Opinion (PCT/ISA/237) issued in PCT Application No. PCT/EP2018/064673 dated Jul. 25, 2018 (five (5) pages).

\* cited by examiner

SHELVING SYSTEM

BACKGROUND OF THE INVENTION

Field of the Invention

The present invention relates to a shelving system and, in particular, to a shelving system for a motor vehicle.

Description of Related Art

From German Publication DE 93 00 972 U1, a recyclable material collector having a moveable support structure and collecting containers that can be positioned therein for separately receiving various recyclable material fractions is disclosed. The support structure has a pivot axis in the support base, on which the collecting containers having a front engagement groove on the side of the base that can releasably latched for tipping out in a recyclable material input setting are mounted and, substantially in parallel to the front engagement groove, in each case a releasably latching rear engagement groove is provided in the collecting container base for mounting partially positioned collecting containers on the pivot axis.

Furthermore, from German Publication DE 201 02 573 U1, a collecting container that can be tilted via its front lower edge in a shelf is known. German Publication DE 20 2012 011 292 U1 shows a shelf plank that can preferably be folded downwards for side interior walls of vans, tour vehicles and estate cars. A shelving system having a shelf container than can be tilted out away from the front side of the shelving system via a front lower edge is disclosed in German Publication DE 10 2014 105 723 A1. A shelf plank that can be pivoted around a horizontal axis for cargo areas for transportation vehicles is specified in the published patent application German Publication DE 20 2014 111 540 A1, said shelf plank being able to be supported, for example, by means of a cylinder. Furthermore, a shelving system for a vehicle boot with foldable shelf segments that are fixed on the tail side to a back-seat rest is known from international PCT Publication WO 01/40 023 A2.

Conventional shelves can have a tilting function, in which the entire shelf base can be brought into an inclined position, for example a loading position, in order to simplify the loading and unloading. If this shelf base is at least partially loaded, a force needed to tilt this shelf base back into an at least substantially horizontal base position is particularly high, since the whole shelf base, along with the load found thereon, must be pivoted into the base position by a user of the shelf. Furthermore, contingent on the construction, a particularly small angle between the base position and the loading position can be achieved, which is usually about 20 degrees. However, this is not sufficient for a particularly simple loading and unloading. Moreover, with conventional shelves, this angle between the base position and the loading positions is predetermined and, in particular, cannot be set, which would nevertheless be desirable in order to enable a particularly ergonomic loading and unloading for users with different body sizes. Moreover, in order for the load to be able to be removed from the shelf base, it is too flat across a load edge that is provided, in particular, for a load protection. Particularly when with upper levels of a shelving system with several floors, this raising of the load is not economical. Furthermore, with a conventional shelf, the shelf base can usually only pivot on one side, in particular the longitudinal side, of the shelf into the loading position. This means that the conventional shelf can only be loaded and unloaded from one side.

SUMMARY OF THE INVENTION

The object of the present invention it to provide a particularly ergonomic and variable shelving system.

This object is achieved according to the invention by a shelving system having the features claimed. Advantageous embodiments having expedient developments of the invention are also specified in the claims.

According to the invention, a shelving system is provided, in particular for a motor vehicle, having at least one shelf, which comprises at least one base unit having at least one base element, which is supported in a base position allocated to the base element on at least one support element and is mounted on a pivoting axis, around which the base element can be displaced from the base position allocated to it into an access position allocated to the base element, in which access position the base element is raised from the at least one support element. In particular, the motor vehicle can be formed, for example, as a delivery vehicle. The shelf system can be installed inside the motor vehicle, in particular in its cargo space, said system having the at least one shelf. In turn, the shelf has at least one base unit having at least one base element. The base element is connected to the pivot axis in such a way that it can be shifted rotatably around it yet not along it. By the base element being rotatable around the pivot axis, the base element can be displaced from the base position allocated to the base element into an access position also allocated to the base element, i.e. can be pivoted. In the base position allocated to the base element, the base element touches the at least one support element, such that the base element is held in its base position by the at least one support element and the pivoting axis. In the access position allocated to the base element, the base element is arranged without touching the at least one support element, i.e. the base element is raised by the at least one support element. Since the base element is rotatably connected to the pivoting axis, there is an adjusting angle between the base position allocated to the base element and the access position allocated to the base element.

In order to provide a particularly ergonomic and variable shelving system, according to the invention, the base unit comprises a further base element, which is supported on the at least one support element in a base position allocated to the further base element and is mounted on a further pivoting axis, which is arranged on the side of the at least one support element, said side lying opposite the first pivoting axis and around which the further base element can be shifted out of the base position allocated to it into a access position allocated to the further base element, in which access position the further base element is raised by the at least one support element. The base element and the further base element can here be supported in their respective base position on two or more different support elements, such that at least one individual support element is allocated to each base element. Alternatively, the base element and the further base element can also be supported in their respective base position on one single support element. This means that the base unit can be formed in two parts. In other words, the base unit can be formed by the base element and the further base element. The shelving system comprises a further pivoting axis, which can be formed structurally identical to the first pivoting axis. The further pivoting axis lies opposite the first pivoting axis and runs parallel to this. The at least one support element runs between the two pivot axes, such that a distance between a central axis of the at least one support element and the first pivoting axis corresponds to a distance between the central axis of the at least one support element and the further pivoting axis at least substantially. Again, in other words, the first pivoting axis and the second pivoting axis are arranged in mirror image to each other. The further base element is analogously connected to the further pivoting axis, as the first base element is connected to the first pivoting axis. This means that the further base element can be pivoted out of the base position allocated to the further base element around the further pivoting axis, whereby the further base element can be shifted into the access position allocated to the further base element, i.e. can be pivoted. In the base position of the further base element, it touches the at least one support element, whereas the further base element in its access position is arranged apart from the at least one support element. i.e. is arranged to not be touching the at least one support element.

With this shelving system, it is thus simply possible to more variably load the shelf comprising the base unit in comparison to a conventional shelving system. Nevertheless, by the base unit comprising the base element and the further base element and thus being constructed in two parts, it is possible for a user of the shelving system to load the shelf from a side of the shelving system next to the first pivoting axis or from a side of the shelving system next to the further pivoting axis. In particular when the shelving system can be accessed via the two sides next to the respective pivoting axes, this is particularly advantageous since the user of the shelving system does not need to walk around the shelving system in order to load the shelving system, and in particular the shelf. Furthermore, it is conceivable that the shelving system is arranged on a shelving system pull-out, for example in a cargo space of a delivery vehicle. The shelving system is then guided via the shelving system pull-out and can be pulled out at least partially from the cargo space of the delivery vehicle, such that the shelving system then extends out from an outer contour of the supply vehicle. Then at least two sides of the shelving system, in particular its longitudinal sides, on which one of the pivoting axes respectively runs, can be accessed by the user of the shelving system. Thus, the user of the shelving system is then not forced to walk around the shelving system or, in an extreme case, around the supply vehicle, in order to load the at least one shelf of the shelving system.

The base unit is preferably formed for receiving a container. This means that the base unit can be shaped in such a way that a container formed as a cuboid vessel, for example, can be received in a receiving space of the base unit. It is particularly preferable when the container can be positively received by means of the base unit. In doing so, the cargo can be secured particularly simply and particularly quickly, since the container received in the base unit is connected to the shelf and thus to the shelving system via the base unit. In particular when the shelving system is used in a motor vehicle, the container can be secured particularly simply by means of a positive lock against the shift.

Furthermore, it has been found to be advantageous when the shelf has a plurality of base units. Thus, an even more ergonomic shelving system is provided since the respective base elements of the respective base units can be displaced separately from one another between their base position and their access position. This means that the base element, for example, can be shifted out of its base position into its access position for loading or unloading a base unit without another base element, in particular another base unit, also having to be shifted into its access position. This is particularly advantageous since a particularly low force is necessary for pivoting back the base element in the access position since only the base element to be pivoted back into the base position and cargo possibly loaded thereon is to be moved. A movement or adjustment of further base elements or base units of the shelf is not necessary. This is particularly ergonomic for a user of the shelving system.

In other words, this means that the shelf can have at least two base units. Furthermore, it is of course conceivable that the shelf has three, four or five base units. It is to be understood that the shelving system can be scaled arbitrarily, i.e. the shelf can have any number of base units. Furthermore, the shelving system can have any number of shelves. In particular, these shelves can be arranged one above the other in a vertical direction.

According to an advantageous development, at least one dimension at least of one of the base units can be formed differently to a corresponding dimension of the other base units. In other words, it can be provided that a width of one of the base units, for example, said width running in parallel to one of the pivoting axes, is formed to be greater or smaller than a respective width of the other base units. For example, at least one base unit can thus be formed for receiving a wider or narrower container. In doing so, the shelving system is formed even more variably.

In a further embodiment, the base elements each have an uneven base edge contour, via which the respective base element in the allocated base position can be supported on the at least one support element. In doing so, the at least one support element can be formed particularly compactly, that is particularly mass-efficiently, which leads to a particularly light shelving system. In particular when the shelving system is arranged in the motor vehicle, a particularly large additional load mass can be ensured with the motor vehicle. Moreover, the motor vehicle can be operated in a particularly fuel-efficient manner.

Furthermore, it is advantageous when the base elements of a base unit each have a base edge contour, and the respective base edge contours correspond to one another. In doing so, it is possible, on one hand, that the respective base edge contours extend across the at least one support element in the direction of the opposite pivoting axis. In particular, the respective base edge contour can extend across two thirds of a length of the respective base unit, for example. In doing so, a danger of the container received in the base unit toppling over is prevented, when one of the base elements of a base unit is pivoted out of its base position into its access position.

It has been shown to be further advantageous when a return unit is provided by means of which the base elements can each be adjusted from their respectively allocated access positions into their respectively allocated base position. The return unit can be a spring element, for example, in particular a spring arranged between the base element and the at least one support element. In doing so, it is then provided that the spring element is at least substantially pre-tensioned in the base position of the base element. By tensioning the spring element, the base element can be pivoted from its base position into its access position, in particular manually, for example by the user of the shelving system. If the base element now in the access position is to be arranged back in its base position, it is possible, in particular for the user of the shelving system, to pivot this base element back into its base position by the user letting go of the base element. And here the spring element can be pre-tensioned, whereby the base element in the access position can be adjusted into its base position by pre-tensioning the spring element. In doing so, with the shelving system[[.]], a further advantage in terms of the ergonomics of the shelving system is created, since a separate handle of the user of the shelving system is not necessary for adjusting the base element out of its access position into its base position.

Alternatively or additionally, a limiting unit can be provided by means of which a respective pivoting angle present between the base position and the access position of the respective base elements can be delimited. This means that the limiting unit of the pivoting angle can be delimited, which is arranged between the base position and the access position of the base element. For example, the limiting unit can be formed as a stop, which is arranged in such a way that, in the event of a maximum pivoting angle, the base element abuts thereon, whereby the base element cannot be rotated above the maximum pivoting angle around the pivoting axis. In a particularly preferred embodiment, the limiting unit can be settable, whereby the user of the shelving system is able to set the maximum pivoting angle depending on the use. In doing so, a further advantage in terms of the ergonomics of the shelving system is created, since the user of the shelving system can set the maximum pivoting angle of the respective base elements depending on the use, for example adjusted to the body size of the user. It is particularly advantageous when each base unit can be set individually and/or each base element can be set individually in relation to the maximum pivoting angle.

In a further advantageous embodiment of the invention, a drive unit can be provided by means of which the base elements can each be pivoted from their respectively allocated base position into their respectively allocated access position. In doing so, the shelving system can be implemented even more ergonomically, since the pivoting or adjusting of the base elements takes place automatically. There is also no need for physical strain by the user of the shelving system.

Furthermore, it is also advantageous when at least one side wall of the respective base element has a gripping part. In doing so, it is possible for the user of the shelving system in a particularly easy manner to pivot the respective base element from its base position into its access position. The side wall having the gripping part is particularly preferably formed to be larger in the vertical direction, such that a vertical distance between the gripping part and the pivoting axis, around which the respective base element is to be pivoted, is formed particularly large. This leads to the side wall having the gripping part to be able to serve as a lever element, whereby a particularly low force has to be expended to use the shelving system in order to pivot the base element to be pivoted into its access position or into its base position. This also has a positive effect on the ergonomics of the shelving system.

Moreover, it has proved advantageous when a securing device is provided by means of which the base elements can be reversibly blocked in their base position. The securing device can have a locking device, for example, by means of which the respective base element can be locked in its base position. In particular, the securing device or the locking device can be set up to lock and/or unlock the base elements comprised by the shelf, in particular simultaneously. In a further embodiment, it is conceivable that the securing device or locking element is set up to lock and/or unlock the base elements comprised by the shelving system, in particular simultaneously. This is advantageous, in particular, for securing the shelving system during transportation with the supply vehicle. Nevertheless, an unintentional adjustment of the individual base elements out of their base position into their access position is effectively prevented when the respective base elements are reversibly blocked respectively individually and/or respectively separately in their base position, that is are held in their base position by means of the securing device. The containers or other cargo held in the base elements are thus effectively prevented from dropping out.

Further advantages, features and details of the invention are apparent from the description of a preferred exemplary embodiment below, with the aid of the drawings.

BRIEF DESCRIPTION OF THE DRAWING FIGURES

DETAILED DESCRIPTION OF THE INVENTION

Figure 1:
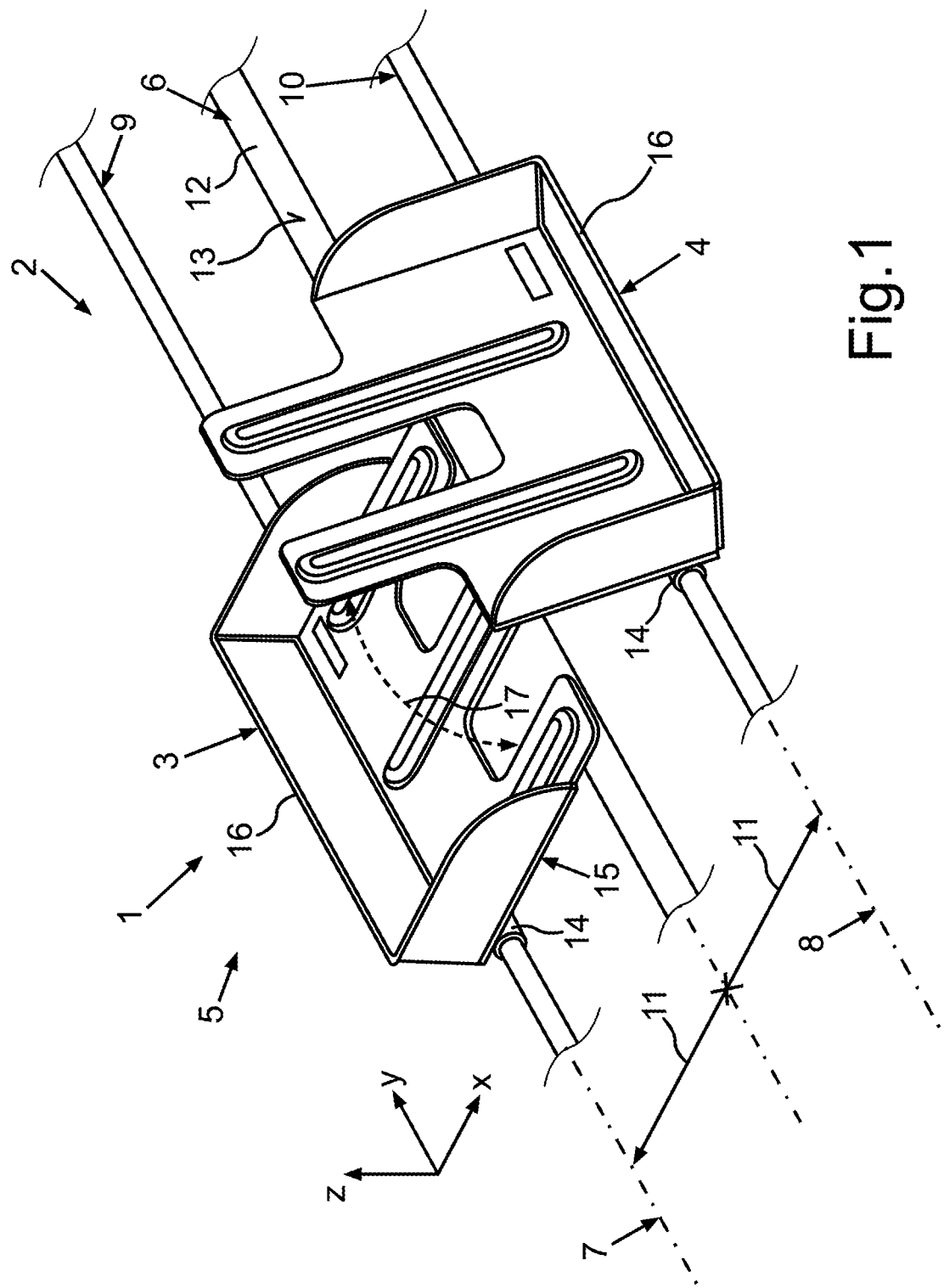
FIG. 1 is a schematic and perspective view of a shelf of a shelving system, wherein a first base element is arranged in its base position and a second base element is arranged in its access position.

In the figures, the same or functionally identical elements are provided with the same reference numerals.

In a schematic and perspective view, FIG. 1 shows a shelf 1 of a shelving system 2, wherein a first base element 3 is arranged in its base position and a second base element 4 is arranged in its access position. The first base element 3 forms a base unit 5 together with the second base element 4. In other words, the base unit 5 comprises the first base element 3 and the second base element 4. The shelf 1 has a support element 6 and a pivoting axis 7 and a further pivoting axis 8. The pivoting axis 7 can be formed by a shaft 9, for example, wherein the further pivoting axis 8 can be formed by a further shaft 10. Here, a central longitudinal axis of the shaft 9 respectively coincides with the pivoting axis 7 and a central longitudinal axis of the further shaft 10 respectively coincides with the further pivoting axis 8. The shaft 9 and the further shaft 10 are formed separately from each other and spaced apart from each other. The support element 6 is arranged between the shaft 9 and the further shaft 10, that is between the pivoting axis 7 and the further pivoting axis 8. In doing so, a central longitudinal axis of the support element 6 is arranged at a distance 11 apart from the pivoting axis 7 and apart from the further pivoting axis 8. Furthermore, the support element 6 runs respectively in parallel to the shaft 9 and the further shaft 10, that is in parallel to the pivoting axis 7 and the further pivoting axis

8. Moreover, the pivoting axis 7, the further pivoting axis 8 and the central longitudinal axis of the support element 6 are on the same plane, for example on the xy plane, as shown in FIG. 1. The support element 6 can be formed as an element shaped like a rope, for example a third shaft 12. An outer peripheral surface of the support element 6 at least partially forms a support surface 13.

The first base element 3 is rotatably connected to the shaft 9 via tilting elements 14. This means that the first base element 3 is mounted rotatably around the pivoting axis 7 on the first shaft 9. The tilting elements 14 can be formed separately from the first base element 3 and can be connected to it, for example adhered, welded, riveted, screwed, etc., Furthermore, it is possible that the tilting elements 14 are formed integrally with the first base element 3. In particular, the respective tilting element 14 is formed in such a way that its central longitudinal axis coincides with the pivoting axis 7. For example, the respective tilting element 14 can have a sleeve corresponding to the shaft 9, such that the shaft 9 runs through the tilting element 14. The first base element is spaced apart from the pivoting axis 7 by means of the tilting element 14 in such a way that an underside 15 of the first base element 3, which is supported on the support element 6 or its support surface 13, is arranged in parallel to the xy plane. By the first base element 3 being rotatably connected to the shaft 9 by means of two tilting elements 14, which are spaced apart from each other, a first rear wall 16 runs in parallel to a y-direction, that is in parallel to the shaft 9 or parallel to the pivoting axis 7.

As a result of the respective tilting element 14, a return unit can be formed, for example by the return unit being integrated into the respective tilting element 14. In particular, the respective tilting element 14 can have a spring element (not shown), which is arranged between the base element 3 and the pivoting axis 7. In particular, the spring element, for example formed as a screw spring, coil spring, flat spring, etc., can be connected to the base element 3 and the pivoting axis 7. This means that the spring element is at least substantially released in the base position of the base element 3. The spring element can have a certain pretension in the base position of the base element 3. By tensioning the spring element, the base element 3 can be pivoted from its base position into its access position, in particular manually, for example by the user of the shelving system 2. Since the spring element tensioned in the access position acts between the pivoting axis 7 and the base element 3, by releasing the spring element, in particular by means of releasing the spring element, the base element 3 can be switched back to its base position. This is particularly advantageous since switching the base element 3 back from its access position into its base position thus functions particularly reliably. For a particularly reliable shifting of the base element 3 from its access position into its base position, it is also conceivable that the return unit is alternatively or additionally arranged between the base element 3 and the support element 6 and thus also acts between them.

In the same way, the second base element 4 is connected to the further shaft 10 and mounted rotatably around the further pivoting axis 8.

A respective base position and a respective access position is allocated to the base elements 3, 4. In the respective base position, the respective base element 3, 4 is supported on the support element 6, in particular on its support surface 13. In other words, an underside 15 of the respective base element 3, 4 is arranged in the respective base position in parallel to the xy plane. It can be seen in FIG. 1 how the first base element 3 is arranged in its base position.

In the respective access position, the respective base element 3, 4 is raised by the support element 6, in particular by the support surface 13. In other words, an underside 15 of the respective base element 3, 4 is arranged in its respective access position at an angle to the xy plane. It can be seen in FIG. 1 how the second base element 4 is arranged in its access position.

This means that the respective base element 3, 4 in its base position is in direct, immediate contact with the support element 6, in particular with its support surface 13, whereas the respective base element 3, 4 in its access position is arranged without touching the support element 6, in particular the support surface 13. If one of the base elements 3, 4 is arranged in the respective access position, then a pivoting angle emerges, around which the respective base element 3, 4 is rotated out of its base position around the respective pivoting axis 7, 8 into the access position.

By the respective base element 3, 4 being able to be shifted out of the respective base position into the respective access position, it is possible for the user of the shelving system 2 to load the base unit 5 with cargo with little effort. A purely vertical movement, that is in a z-direction, in order to raise the cargo above the rear wall is unergonomic and is to be avoided by means of the shelving system 2. Instead, the user of the shelving system 2 can be manoeuvred into the base unit 5 in an extensively more ergonomic movement course. To do so, they have the choice of shifting the first base element 3 or the second base element 4 into the respectively allocated access position. The same applies to removing cargo from the base unit 5. By it being possible for the user of the shelving system 2 to shift the first base element 3 or the second base element 4 into its access position, the shelving system 2 is also particularly variable, since the respective base unit 5 is to be loaded from a side of the first base element 3 or from a side of the second base element 4.

Figure 2:
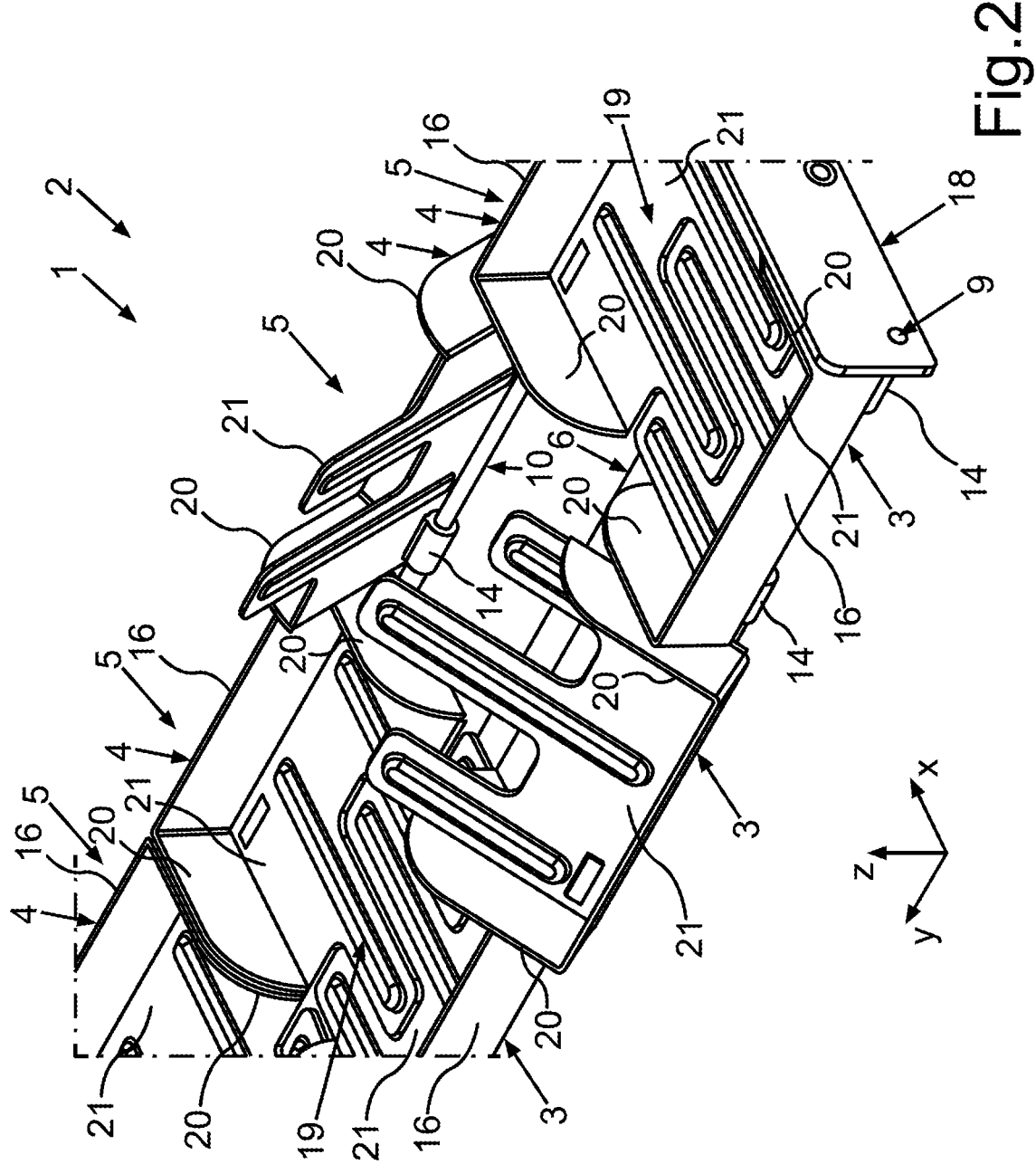
FIG. 2 is a schematic and perspective view of the shelf with a plurality of base units.

In a schematic and perspective view, FIG. 2 shows the shelf 1 with a plurality of base units 5. Furthermore, it can be seen in FIG. 2 that the shaft 9, the further shaft 10 and the support element 6 are held on a lateral holding element formed as a carrier plate 18, for example. In particular, the shaft 9 and further shaft 10 can be connected to the carrier plate 18 in a rotationally fixed manner. This means that the tilting elements 14 are rotatably mounted thereon in relation to the shaft 9 penetrating the respective tilting element 14 or further shaft 10. In one of the base units 5 shown in FIG. 2—purely for the purposes of illustration—its first base element 3 and its second base element 4 are each arranged in the respective access position. Further base elements 3, 4 visible in FIG. 2 are each arranged in their base position. In doing so, a receiver space 19 emerges which is bordered by side walls 20 extending vertically, that is in the z-direction, as well as by the rear walls also extending in the z-direction. The side walls 20 and the rear wall 6 can be formed integrally with the respective base element 3, 4. Yet it is also conceivable that the respective side walls 20 are formed integrally together with the corresponding rear wall 16 and are connected to the respective base element 3, 4 and with one another by means of welding, adhering, screwing, etc., for example. Described differently, two side walls 20 arranged in parallel to each other and spaced apart from each other form a rear wall 16 connecting the two side walls 20 together with a base element ground 21, a respective base element 3, 4.

The shelf 1 of the shelving system 2 can thus have more than one base element 5. In particular, the shelf 1 can have two, three, four, five or n base units 5, wherein n can assume the value of any random integer. This means that the shelf 1 can be scaled with respect to the number of the base units 5.

Figure 3:
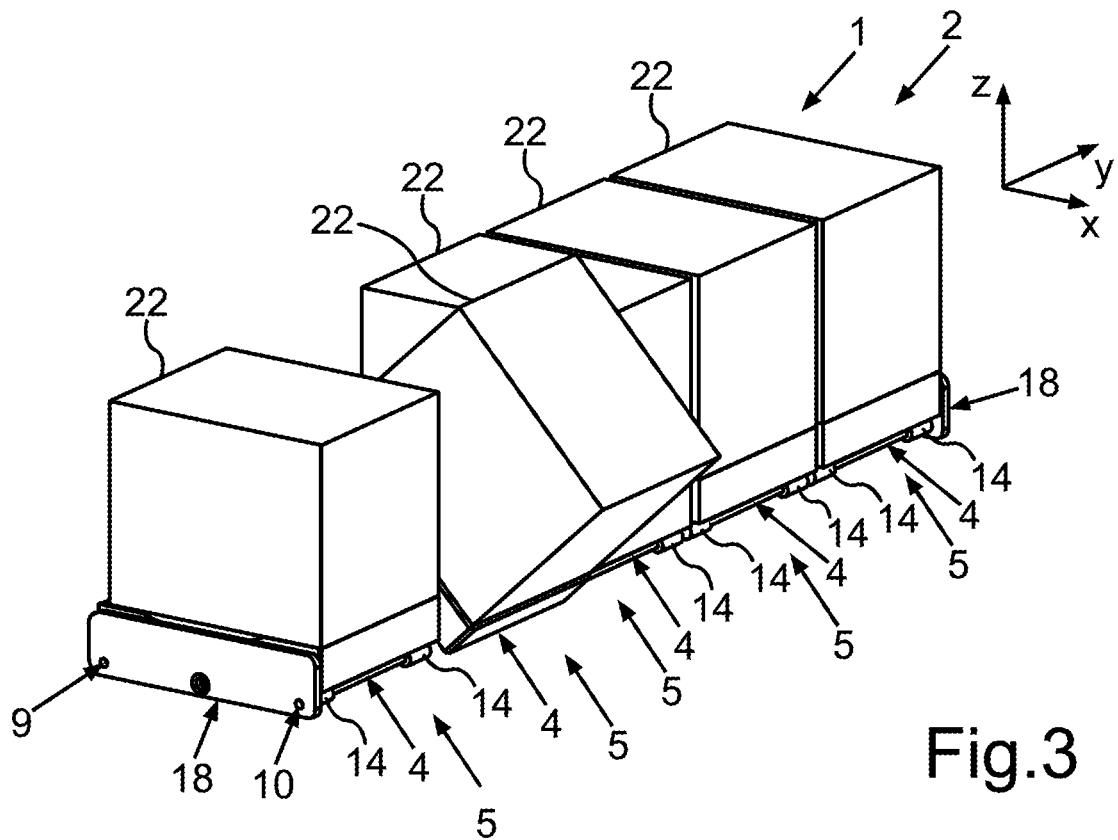
FIG. 3 is a schematic and perspective view of the shelf, in which a container is respectively received in a base unit.

In a schematic and perspective view, FIG. 3 shows the shelf 1, in which in each case a container 22 is received in a respective base element 5. This means that the shelving system 2, at least the shelf ground 1 of the shelving system 2, can be set up to receive containers 22, in particular of the same size. In doing so, the shelving system 2 is particularly advantageous for the user since this can shift the first base element 3 or the second base element 5 of the relevant base unit 5 into the respective access position to remove a container 22 from the respective base unit 5. Firstly, as a result, there is a particularly high degree of variability of the shelving system 2 since the user has the possibility to remove the relevant container 22 from the side of the first base element 3 or from the side of the second base element 4 out of the shelf 1 or out of the shelving system 2. Secondly, the relevant container 22 is at an angle in the access position of the first base element 3 or the second base element 4, that is its raising surface, via which the container 22 contacts the base element ground 21 of the first or second base element 3, 4, is arranged at an angle to the xy plane. Thus, it is particularly easily possible for the user of the shelving system 2 to remove the relevant container 22 from the related base element 5 by a purely vertical movement of the container 22 not happening. This is particularly ergonomic for the user of the shelving system 2.

The respective container 22 can be formed, for example, as a cuboid package, for example a crate, a cardboard box, a bag, a cool bag, etc., As is also shown in FIG. 3, at least one base surface of the container 22 can correspond to a base surface of the receiving space 19. This leads to the container 22 received in the receiving space 19 of the base unit 5 to be positively received in the receiving space 19 of the base unit 5. This is particularly advantageous since, in doing so, the container 22 received in the receiving space 19 is prevented from slipping. Particularly when the shelving system 2 or the shelf 1 is used on a motor vehicle, loading security is thus achieved in a particularly simple manner. Furthermore, it is advantageous that a slipping of a container 22 into a possible adjacent, free base unit 5 is prevented. Display devices possibly used in the motor vehicle, which display to the user, for example, from which of the base units 5 they are to remove a corresponding container 22, then function particularly reliably. In the field of logistics, such a system is known, for example as a pick-by-light (meaning, removed from where the signal lamp is).

Figure 4:
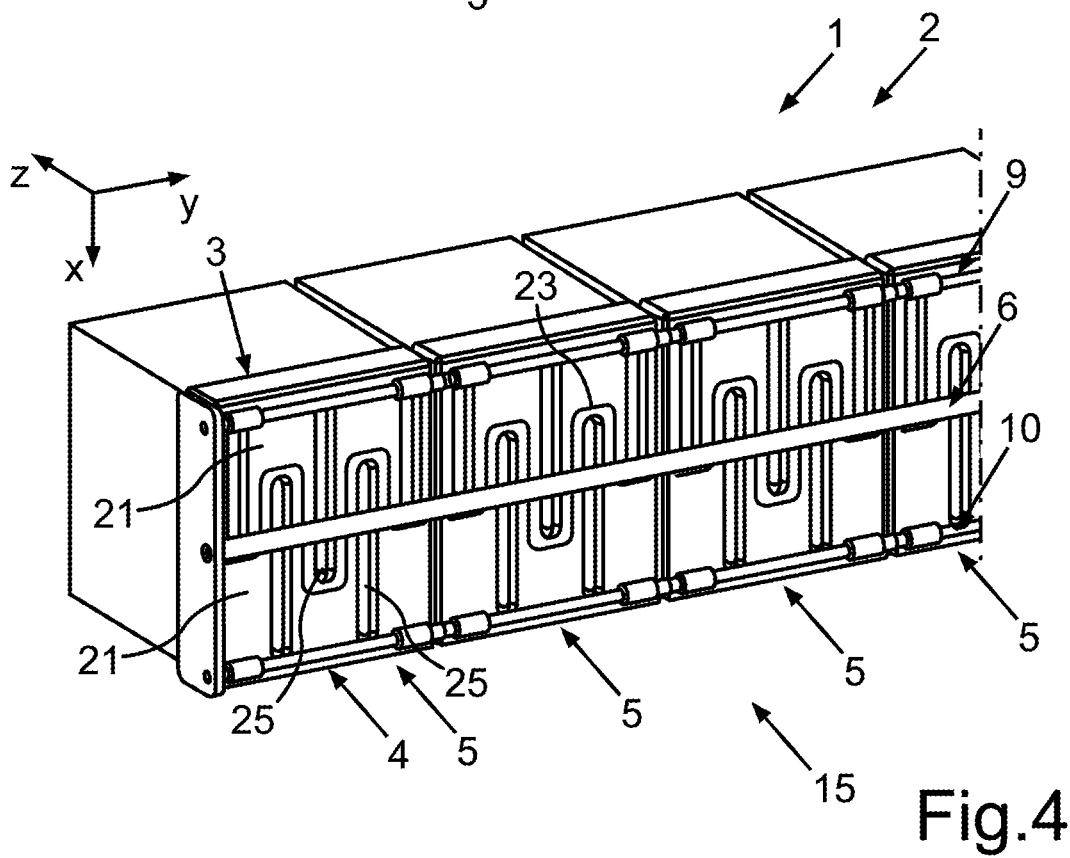
FIG. 4 is a schematic and perspective view of an underside of the shelf.

In a schematic and perspective view, FIG. 4 shows the underside 15 of the shelf 1. It can be seen that the base element ground 21 of the first base element 3 extends in opposition to the second base element 4. In doing so, the base element ground 21 of the first base element 3 extends beyond the distance 11 shown in FIG. 1, such that the extension of the base element ground 21 of the first base element 3 in the x-direction is greater than the distance 11. The same applies analogously to the base element ground 21 of the second base element 4. Its base element ground 21 also has an extension in the x-direction which is greater than the distance 11. In other words, the base element grounds 21 each extend into a region of the respectively opposite base element 3, 4. Here, it is provided that a respective ground edge contour 23 of the corresponding base element 3, 4 is respectively formed in such a way that it corresponds to an opposite ground edge contour 23, this means, for example, that the two opposite ground edge contours 23 can engage into one another. In doing so, the base element 3 and the second base element 4 extend under the container 22 via more than half of an alignment of the container 22 in the x-direction, such that a centre of gravity of the container 22 is engaged under by the first base element 3 and the second base element 4 in each case. It is particularly advantageous that the respective ground edge contour 23 is formed at least regionally unevenly. For example, the ground edge contour 23 can respectively have at least one radius. In particular, the ground edge contour 23 can have at least one right-angled kink in its course. In doing so, when shifting one of the base elements 3, 4 with the container 22 arranged thereon, it is prevented that this tilts over in the direction of the other base element 3, 4. Furthermore, it can be seen in FIG. 4 that the respective base element 3, 4 respectively has at least one strengthening element 25. As presented above, the strengthening element 25 can be, for example, at least one ribbing which is stamped into the respective base element ground 21. A particularly high surface inertia torque is given, in each case, to the respective base element ground 21 and thus the respective base element 3, 4 by means of such a strengthening element 25. In turn, this is expressed in a particularly high bending resistance of the respective base element ground 21 and thus the respective base element 3, 4. This means that a shape stability of the respective base element 3, 4, is ensured.

Figure 5:
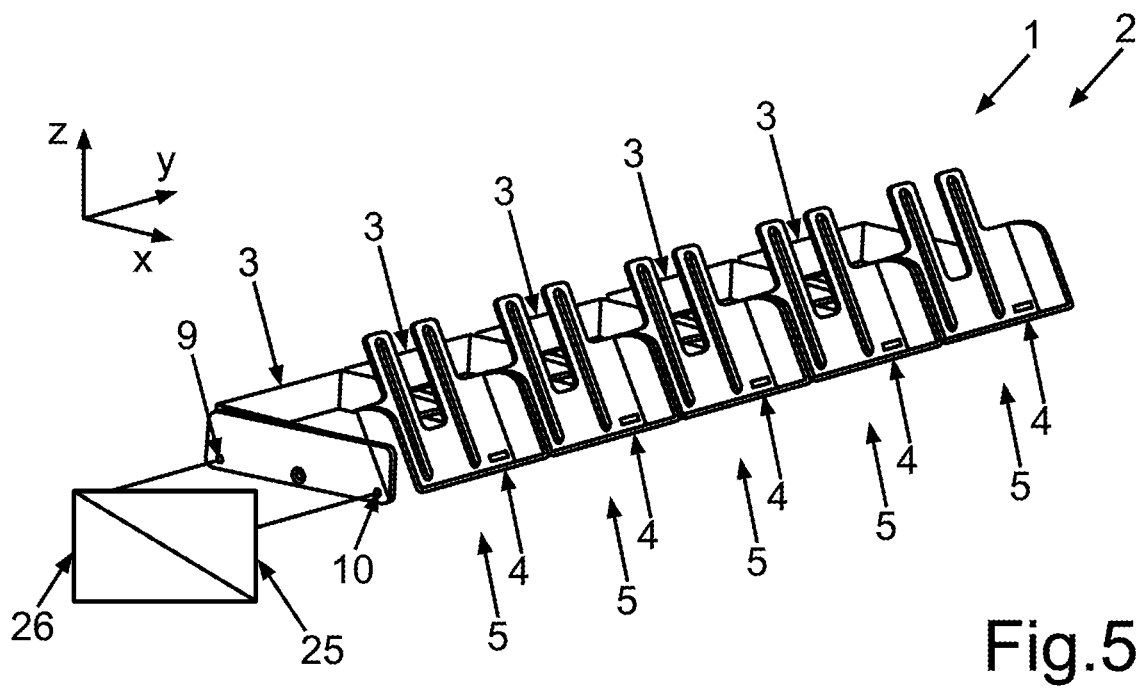
FIG. 5 is a schematic and perspective view of the shelf, wherein the base elements are arranged in their access position along a longitudinal side of the shelf.

In a schematic and perspective view, FIG. 5 shows the shelf 1 of the shelving system 2, wherein its second base elements 4 are respectively arranged in their access position in a longitudinal extension direction 2. A drive unit 25 can be provided, which is mechanically connected to the pivoting axis 7 and/or to the further pivoting axis 8. This means that the drive unit 25 can be connected, for example, to the shaft 9 and/or to the further shaft 10 in such a way that the shaft 9 or the further shaft 10 can be rotated by means of the drive unit 25. This means that at least one base unit 5 of the shelf 1 can be shifted out of its base position into its access position by means of the drive unit 25. It is preferably provided that the first base elements 3 of the shelf 1 can be shifted simultaneously from their respective base position into their respective access position by means of the drive unit 25 and vice versa. Analogously, it is provided that the second base elements 4 of the shelf 1 can be simultaneously shifted out of their respective base position into their respective access position by means of the drive unit 25 and vice versa. To do so, the drive unit 25 can have at least one motor, by means of which the shaft 9 and/or the further shaft 10 can be driven.

In a further embodiment of the shelf 1, it is provided that in each case a drive unit 25 is allocated to the respective base unit 5, whereby the respective base elements 3, 4 can be shifted separately from one another from the respective base position into the respective access position by means of the respectively allocated drive unit 25 and vice versa. In doing so, an even more ergonomic shelving system 2 is created, since the user of the shelving system 2 does not have to expend any bodily force in order to shift a respective base element 3, 4, between its base position and its access position.

Furthermore, the shelf 1 of the shelving system 2 can have a bordering unit 26, by means of which the pivoting angle 17 of the respective base elements 3, 4 can be limited. To do so, the bordering unit 26 can be mechanically connected to the pivoting axis 7 and/or to the further pivoting axis 8. In particular, the bordering unit 26 can be connected to the shaft 9 and/or the further shaft 10. Thus, it is possible, for example, to simultaneously set the respective pivoting angle 17 of the individual base elements 3, 4, that is to limit them. Yet it is also conceivable that the limiting unit 26 selectively acts on the base units 5 of the shelf 1. Thus, a respective pivoting angle 17 can be respectively set or limited separately and/or to a different extent. In this context, it can also be provided that each of the base units 5 of the shelf 1 are effectively connected to a respective limiting unit 26.

The limiting unit 26 can be formed, for example, as an electronic control component of the drive unit 25. Yet it is also conceivable that the limiting unit 26 is designed purely mechanically, that is as a stop, for example, on which the respective base elements 3, 4 abut on reaching the maximum desired pivoting angle.

The limiting unit 26 is advantageous since an upper edge of the container 22 running in the y-direction could stop a further shelf possibly arranged above the shelf 1 when pivoting a base element 3, 4 loaded with a container 22. By the pivoting angle 17 being able to be limited or set by means of the limiting unit 26, the pivoting angle 17 can be correspondingly limited or set, such that a stop of the upper edge of the container 22 on the further shelf possibly arranged above the shelf 1 is effectively prevented. Furthermore, it can be prevented in such a way that, when pivoting the respective base element 3, 4, a person is clamped in between the upper edge of the container 22 and the further shelf, when they have placed a hand in the region of the upper edge of the container 22, for example, or grip the upper edge.

Figure 6:
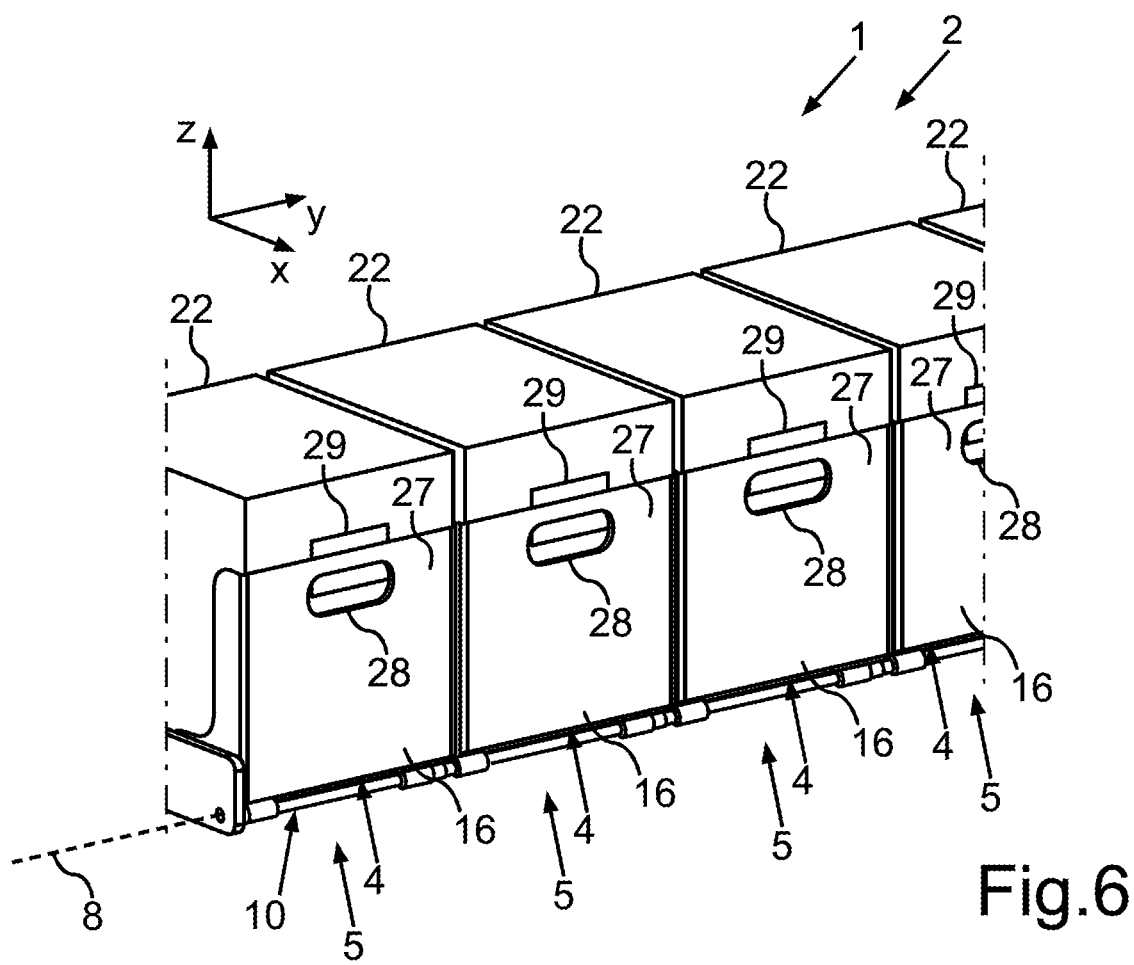
FIG. 6 is a schematic and perspective view of the shelf, in which a respective side wall of the respective base element has a gripping part.

In a schematic and perspective view, FIG. 6 shows the shelf 1, in which a respective rear wall 16 of the respective base element 3, 4 has a gripping part 27. The gripping part 27 can be designed to be integral with the rear wall 16. For this purpose, the rear wall 16 can extend further in the z-direction. For example, the rear wall 16 can extend over more than half of the container 22 located in the base unit 5. Preferably, the rear wall 16 can extend in the z-direction over more than two thirds of the container 22 located in the base unit 5. The respective gripping part 27 has a gripping element formed as a gripping opening 28, for example, in its upper region. Furthermore, the container 22 received in the base unit 5 can have a gripping aid element formed, for example, as a gripping hollow 29. Here, the gripping hollow 29 is advantageously arranged at a height corresponding with the gripping opening 28. Thus, it is particularly easily possible for the user of the shelving system 2 to grip the corresponding base element 3, 4 using the gripping element, that is using the gripping opening 28 and using the rear wall 16. In turn, in doing so, it is particularly easy for the user of the shelving system 2 to pivot the corresponding base element 3, 4 out of its base position into its access position. As a result of the gripping element or gripping opening 28 being remote from the respective pivoting axis 7, 8 in the z-direction, the rear wall 16 extended through the gripping part 27 fulfils a lever effect. Depending on the gripping element being further remote from the pivoting axis 7, 8 in the z-direction, the user has to expend less force to pivot the respective base element 3, 4 into its access position.

Figure 7A:
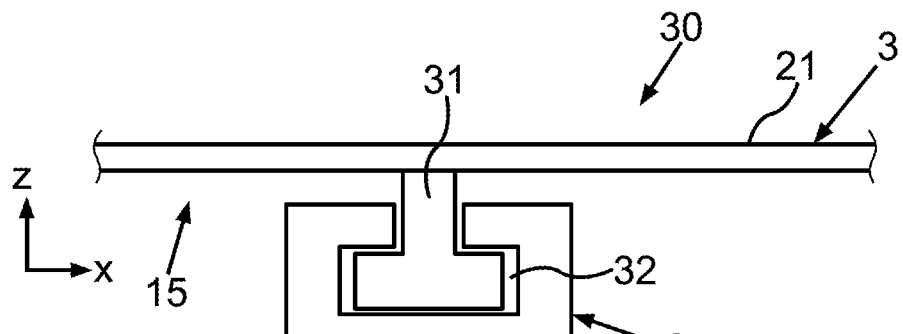
FIG. 7 is a schematic view of a securing device in a securing position (FIG. 7*a*) and in a releasing position (FIG. 7*b*)

In a schematic view, FIG. 7a shows a securing device 30 in a securing position. The base elements 3, 4 of a shelf 1 can be secured in their respective base position by means of the securing device 30. This means that, in each case, a securing device 30 is allocated to the base elements 3, 4 of the shelf 1, that is interacts with them. Since the securing device 30 interacts in the same way in connection with the base elements 3, 4, only the securing device 30 is representatively described below in connection with the first base element 3.

Thus, FIG. 7a shows the base element ground 21 of the first base element 3. A blocking element 31 is arranged on an underside of the shelf ground 21, that is on the underside 15 of the shelf 1, and is connected to the base element ground 21. In doing so, the blocking element 31 is formed integrally with the base element ground 21. Furthermore, the blocking element 31 can be formed separately to the base element ground 21 and can be directly connected to it, for example by means of welding, adhering, screwing, etc. In other words, this means that the blocking element 31 is fixedly connected to the base element ground 21. Furthermore, the support element 6 is depicted in FIG. 7a, wherein the support element 6 is formed as an angular, strand-like support element 6.

The blocking element 31 extends into an inside of the support element 6, in particular into a blocking element receiver 32, in which it is locked in the securing position, as shown. This means that, in the securing position of the securing device 30, the first base element 3 is secured in its base position. Expressed differently, the first base element 3 in the securing position of the securing device 30 cannot be pivoted from the base position allocated to the base element 3 into its access position.

Figure 7B:
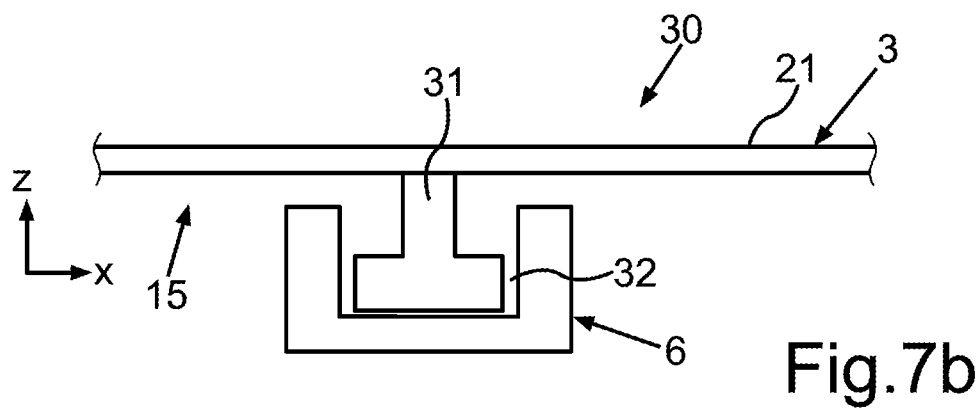

In order to release the blocking element 31 and thus the first base element 3, in order to be able to pivot this from its base position into its access position, the blocking element 31 can be unlocked by the support element 6. In doing so, the support element 6 can be translationally moveable, for example, in the y-direction (perpendicular to the drawing plane). Thus, an unlocking opening 33 can be brought into agreement with the blocking element 31, such that the blocking element 31 is no longer blocked by the securing device 30, but is released by the support element 6. In other words, the securing device 30 can be shifted into the releasing position by a translational shifting of the support element 6, as is shown in FIG. 7b.

Such a securing device 30 is advantageous since it is thus prevented that the first base element 3 and/or the second base element 4 are unintentionally pivoted out of their respective base positions. In particular, with regards to the loading security, this securing device 30 is particularly advantageous.

Figure 8:
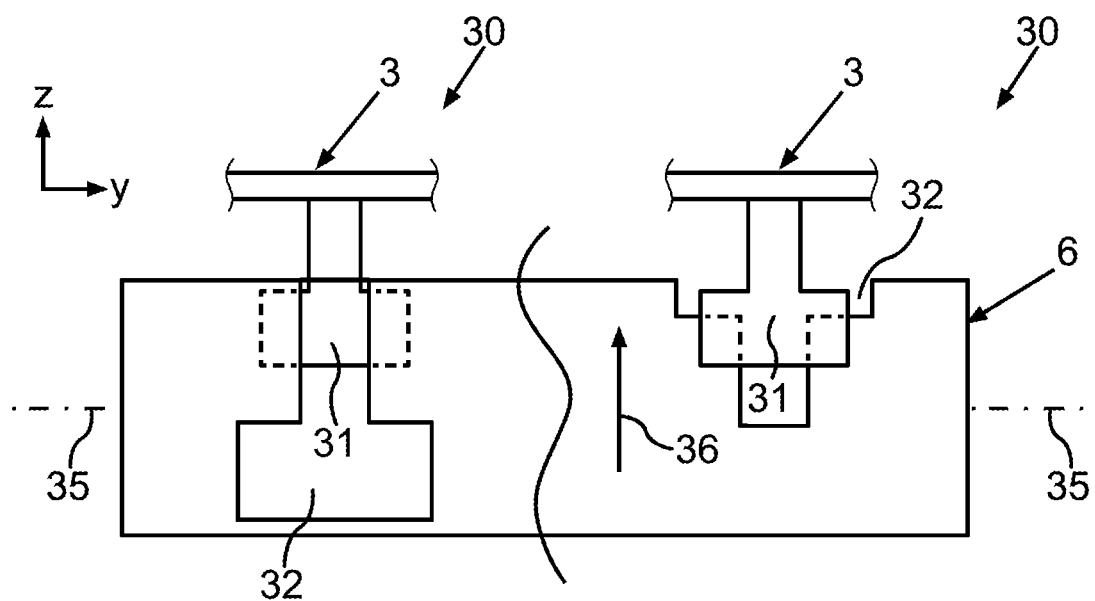
FIG. 8 is a schematic view of a further embodiment of the securing device in a securing position and in a releasing position.

In a schematic view, FIG. 8 shows a further embodiment of the securing device 30 in a securing position and in a releasing position. In doing so, the support element 6 is formed as a hollow shaft. The support element 6 formed as a hollow shaft has the blocking element receiver 32, which penetrates an outer wall 34 of the support element 6. In the left part of FIG. 8, the first base element 3, which is fixedly connected to the blocking element 31, is held in the securing position by means of the securing device 30. Because of the geometric shape of the blocking element receiver, the blocking element 31 is blocked inside the hollow shaft or inside the support element 6. In other words, the blocking element 31 is locked to the support element 6. As already described, in the securing position of the securing device 30, it is not possible to pivot the first base element 3 out of its base position into its access position.

In order to be able to unlock the first base element 3 or the blocking element 31 by means of the securing device 30, the support element 6 formed as a hollow shaft can be rotated about its central longitudinal axis 35. In particular, the support element 6 formed as a hollow shaft can be rotated or turned in an unlocking direction 36. By the support element 6 being turned or rotated in the unlocking direction 36, the blocking element receiver 32 is compatible with the blocking element 31, as is depicted in the right part of FIG. 8. In this state, the blocking element 31 is no longer locked to the support element 6, such that the securing device 30 is arranged in its releasing position.

It is conceivable that the securing device 30 is manually set by means of the user of the shelving system 2 between the securing position and the releasing position. This means that the user can move the support element 6, for example, translationally along its central longitudinal axis and/or rotationally around its central longitudinal axis 35 in order to lock or unlock the blocking element 31 with the support element 6.

The invention claimed is:

1. A shelving system, having at least one shelf, comprising:
    at least one base unit comprising a first base element and a second base element that face each other,
    a support element,
        wherein each base element comprises:
            a generally planar bottom surface,
            a rear wall and opposed sidewalls extending upwardly from the bottom surface; and
        the first base element of the at least one base unit supported in a base position wherein the first base element is horizontal and rests on the support element and is mounted on a first pivoting axis, around which the first base element can be pivoted out of the base position and into an access position, in which a distal portion the first base element is raised above the support element,
    wherein the second base element is supported in a base position wherein the second base element is horizontal and rests on the support element and is mounted on a second pivoting axis arranged on a side of the support element that is opposite from the first pivoting axis and around which the second base element is configured to pivot out of the base position into an access position wherein a distal portion of the second base element is raised above the support element; wherein in the base position the bottom surfaces of the first and second base elements are coplanar along a horizontal axis.

2. The shelving system according to claim 1, wherein each base unit is configured to receive a container.

3. The shelving system according to claim 1, wherein the the at least one base unit is a plurality of base units.

4. The shelving system according to claim 3, wherein at least one dimension of at least one of the plurality base units is formed differently than a corresponding dimension of another base unit from said plurality of base units.

5. The shelving system according to claim 1, wherein the first and second base elements of each base unit have offset ground edge contours supported on the support element in the base position.

6. The shelving system according claim 1, further comprising a limiting unit by which a respective pivoting angle between the base position and the access position of the first and second base elements can be limited.

7. The shelving system according claim 1, further comprising a drive unit by which each of the base elements can be pivoted from the base position into the access position.

8. The shelving system according to claim 1, the rear wall of each respective base element that has a gripping part.

9. The shelving system according to claim 1, further comprising a securing device by which the first and second base elements can be fixed in the base position.

10. The shelving system according to claim 2, wherein the the at least one base unit is a plurality of base units.

11. The shelving system according to claim 10, wherein at least one dimension of at least one of the plurality base units is formed differently than a corresponding dimension of another base unit from said plurality of base units.

\* \* \* \* \*